United States Patent
Schmidt et al.

(10) Patent No.: US 7,995,890 B2
(45) Date of Patent: Aug. 9, 2011

(54) DEVICE FOR LIGHT-BASED PARTICLE MANIPULATION ON WAVEGUIDES

(75) Inventors: Holger Schmidt, Capitola, CA (US);
Philip Measor, Scotts Valley, CA (US);
Sergei Kuehn, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 371 days.

(21) Appl. No.: 12/350,003

(22) Filed: Jan. 7, 2009

(65) Prior Publication Data

US 2009/0175586 A1 Jul. 9, 2009

Related U.S. Application Data

(60) Provisional application No. 61/019,554, filed on Jan. 7, 2008.

(51) Int. Cl.
*G02B 6/00* (2006.01)
*G01N 21/00* (2006.01)

(52) U.S. Cl. .......................................... 385/129; 385/131
(58) Field of Classification Search .............. 385/12–14, 385/129–133, 143
See application file for complete search history.

(56) References Cited

U.S. PATENT DOCUMENTS

| | | |
|---|---|---|
| 3,710,279 A | 1/1973 | Ashkin |
| 5,343,542 A * | 8/1994 | Kash et al. ....................... 385/31 |
| 6,542,231 B1 * | 4/2003 | Garrett ........................... 356/246 |
| 7,127,146 B2 | 10/2006 | Schmidt et al. |
| 7,149,396 B2 | 12/2006 | Schmidt et al. |
| 7,391,949 B2 * | 6/2008 | Schmidt et al. ............... 385/132 |
| 2004/0252957 A1 * | 12/2004 | Schmidt et al. ............... 385/131 |

OTHER PUBLICATIONS

Ashkin, A., "Acceleration and Trapping of Particles by Radiation Pressure," *Phys. Rev. Lett.*, 1970, 24(4), p. 156-159.
Ashkin, A., "Optical trapping and manipulation of neutral particals using lasers," *Proc. Natl. Acad. Sci. USA*, 1997, 94, p. 4853-4860.
Constable et al., "Demonstration of an fiber-optical light-force trap," *Opt. Lett.*, 1993, 18(21), p. 1867-1869.
Cran-McGreehin et al., "Integrated monolithic optical manipulation," *Lab on a Chip*, 2006, 6, p. 1122-1124.
Measor et al., "Hollow-core waveguide characterization by optically induced particle transport," *Opt. Lett.*, 2008, 33, 672-674.
Renn et al., "Laser Guidance and Trapping of Mesoscale Particles in Hollow-Core Optical Fibers," *Phys. Rev. Lett.*, 1999, 82(7), p. 1574-1577.

* cited by examiner

*Primary Examiner* — Akm E Ullah
(74) *Attorney, Agent, or Firm* — Woodcock Washburn LLP

(57) ABSTRACT

An optical waveguide is provided which comprises a non-solid core layer surrounded by a solid-state material, and two light sources capable of introducing light into said non-solid core at opposite ends along a Z-axis of said non-solid core to form two propagating light beams applying force in opposing directions. An integrated optical particle trap device for controlling the placement of small sample particles incorporates the optical waveguide.

41 Claims, 6 Drawing Sheets

2-BEAM TRAP

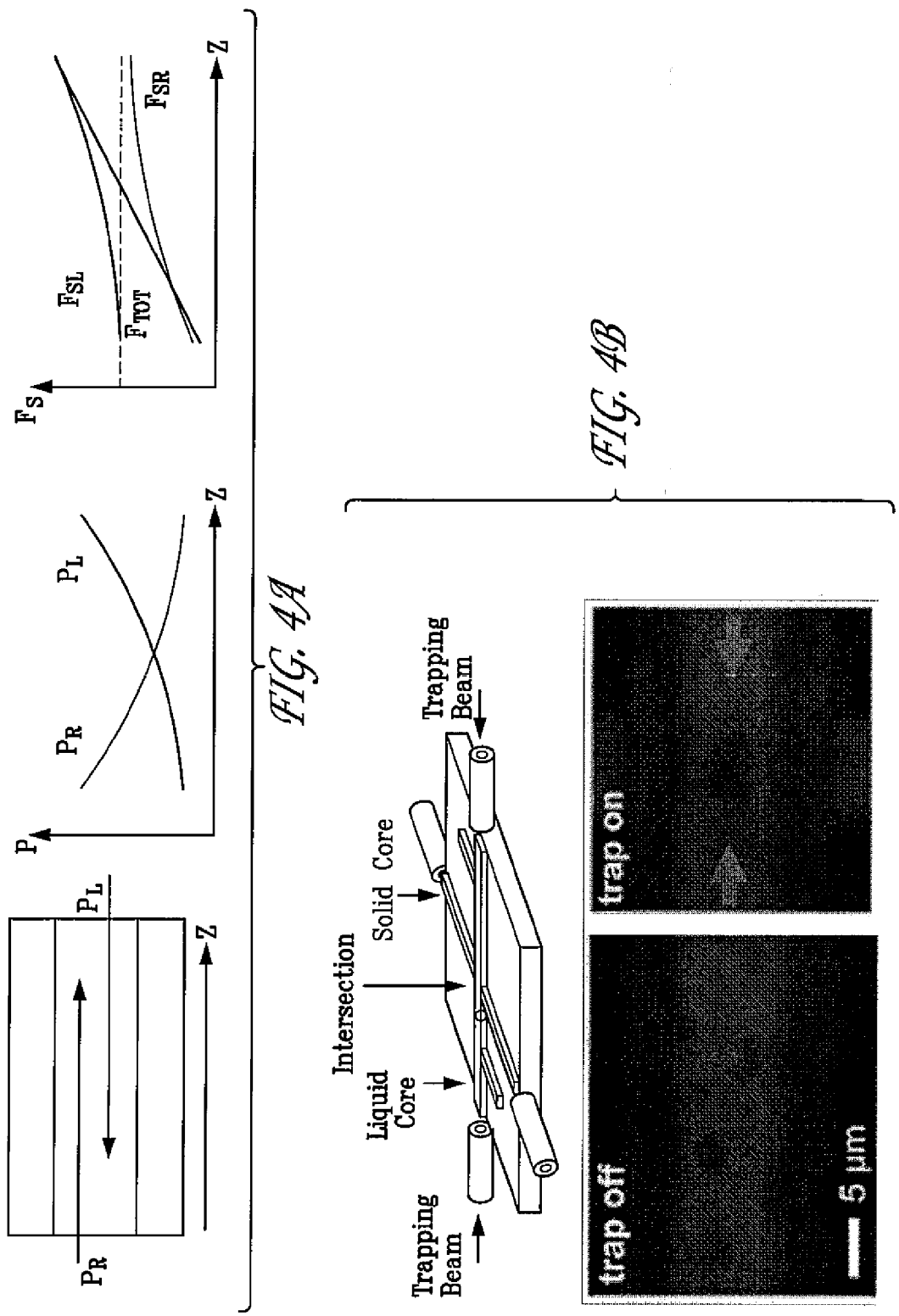

DEVICE FOR LIGHT-BASED PARTICLE MANIPULATION ON WAVEGUIDES

CROSS REFERENCE TO RELATED APPLICATIONS

This application claims the benefit of Provisional Application Ser. No. 61/019,554, entitled "Device for Light-based Particle Manipulation on Waveguides", filed Jan. 7, 2008, the contents of which are incorporated herein in their entirety.

STATEMENT OF GOVERNMENT SUPPORT

The inventions claimed in the present application were developed using U.S. Government funds under Grant No. ECS-0528730 from the National Science Foundation, and Grant No. 5R01EB006097 from the National Institutes of Health.

TECHNICAL FIELD

The present invention relates generally to the field of integrated optics, and more particularly to an optical waveguide comprising a non-solid core layer surrounded by a solid-state material, and two light sources capable of introducing light into said non-solid core at opposite ends along a Z-axis of said non-solid core to form two propagating light beams applying force in opposing directions.

BACKGROUND

Early studies proposed and demonstrated that the radiation pressure that light exerts on matter can be used to manipulate particles ranging in size from single atoms to large cells using laser light A. Ashkin, *Proc. Natl. Acad. Sci. USA*, 94: 4853, 1997. Since then, a number of methods to control the location of (trap) particles based on this idea have been developed. These include both dual beam traps, and single beam traps such as levitation traps and optical tweezers. The dual beam trap shown in FIG. 1a is capable of trapping a particle at the equilibrium point E using two Gaussian laser beams, i.e., it can be confined in x-, y-, and z-directions simultaneously. The confinement along x and y results from a gradient force due to the decreasing intensity of the laser beam away from the optical axis through points A, B, and E. Trapping along z is accomplished by balancing the scattering force exerted on the particle by the two counterpropagating beams at point E. U.S. Pat. Nos. 7,127,146; 7,149,396; 3,710,279; Constable et al., *Opt. Lett.* 18: 1867, 1993; Cran-McGreehin et al., *Lab on a Chip* 6: 1122, 2006; *Proc. Natl. Acad. Sci. USA*, 94: 4853, 1997; M. J. Renn et al., *Phys. Rev. Lett.*, 82: 1574, 1999.

The scattering force Fs is proportional to Fs~P/A, where P is the total power contained in the beam and A is the beam area. The conventional dual beam trap of FIG. 1a works based on the difference of beam area $A_L(z)$ and $A_R(z)$ between the left and right propagating beams as a function of z. At point E where both beam areas are the same, there is no net scattering force. The particle is trapped because any displacement from point E along z will create an imbalance between $F_{SL}$ and $F_{SR}$ that drives the particle back towards E.

A need exists in the art to be able to trap particles inside microfluidic channels without having to use external microscopes to create the required beam profiles that are used in the dual beam trap or laser tweezers. In particular, a preferred solution would be to accomplish trapping with integrated optical waveguides. Unfortunately, the conventional dual beam trap as described above cannot be implemented in a waveguide by tailoring its shape. The reason is that two counterpropagating beams in a waveguide will always be confined to the same mode area (such as the one shown in FIG. 1b) at any given point along the propagation direction. Therefore, there is no way to create the imbalance in area that would result in a z-dependent scattering force as in the dual beam trap.

SUMMARY

The present invention relates to the field of integrated optics, and more particularly to an optical waveguide comprising a non-solid core layer surrounded by a solid-state material, and two light sources capable of introducing light into said non-solid core at opposite ends along a Z-axis of said non-solid core to form two propagating light beams applying force in opposing directions. The present invention introduces concepts for trapping and manipulating particles in microfluidic channels using planar optical waveguides with dual beam traps using integrated optics to help trap a particle. Being able to accomplish these tasks without the need for additional microscopy equipment will result in planar, smaller, and easier-to-use traps that will play a huge role in emerging optofluidic systems that interrogate biomolecules and cells with single particle control.

An optical waveguide is provided which comprises a substrate made of a solid material and multiple layers of solid state material disposed on the substrate, and a non-solid core extending through at least one of said multiple layers, wherein said non-solid core may be used to contain a sample material, and two light sources capable of introducing light into said non-solid core at opposite ends along a Z-axis of said non-solid core to form two propagating light beams applying force in opposing directions, wherein the two light sources have a finite propagation power loss that is Z-dependent in the waveguide and are capable of moving the sample material toward a zero total force point within the waveguide. The power of the two opposing light sources is capable of adjustment to move the sample material within the waveguide. The non-solid core can have an index of refraction which is lower than the index of refraction of the surrounding solid-state material, and wherein light can be transmitted with low loss through the non-solid core. The optical waveguide can include, but is not limited to, an ARROW waveguide, slot waveguide, hollow-core photonic crystal fiber, omniguide, dual-hollow-core waveguide, or Bragg waveguide.

The optical waveguide can further comprise a high waveguide loss region within the non-solid core to create a large power gradient capable of highly localized sample material confinement. The high waveguide loss region can include, but is not limited to, a tapered width of the waveguide, a lossy material deposited on top of the waveguide, thickness variations in dielectric confinement layers, or a solid segment in the bottom layer of a dual-hollow-core waveguide.

The optical waveguide can further comprise a third light source capable of introducing light into said non-solid core perpendicular to the Z-axis and capable of applying a lateral scattering force to the sample material. The third light source is capable of forcing the sample material into a particle well to prevent further movement of the sample material in the direction of the Z-axis. The substrate can comprise a semiconductor material. The sample material can be micron or sub-micron size particles. The substrate can comprise Silicon (Si) and said multiple layers include SiO2 and SiN. The optical waveguide is generally structured as an anti-resonant reflecting optical waveguide (ARROW). Antiresonant reflecting layers can be positioned adjacent to the non-solid core, whereby light is substantially prevented from leaking out of said core in a transverse direction.

An integrated optical particle trap device for use in controlling the placement of small sample particles is provided which comprises an optical waveguide comprising a channel surrounded by a solid-state material, including a Fabry-Perot reflector adjacent to said channel, whereby light, once injected, is substantially prevented from leaking out of said channel in a transverse direction, and two light sources capable of introducing light into said channel at opposite ends along a Z-axis of said channel to form two propagating light beams applying force in opposing directions, wherein the two light sources have a finite propagation power loss that is Z-dependent in the waveguide and are capable of moving the sample particles along the Z-axis toward a zero total force point within the waveguide. The power of the two opposing light sources is capable of adjustment to move the sample material within the waveguide. The non-solid core can have an index of refraction which is lower than the index of refraction of the surrounding solid-state material, and wherein light can be transmitted with low loss through the non-solid core. The optical waveguide can include, but is not limited to, an ARROW waveguide, slot waveguide, hollow-core photonic crystal fiber, omniguide, dual-hollow-core waveguide, or Bragg waveguide. The small sample particles can be micron or sub-micron size.

The optical waveguide can further comprise a high waveguide loss region within the non-solid core to create a large power gradient capable of highly localized sample material confinement. The high waveguide loss region can include, but is not limited to, a tapered width of the waveguide, a lossy material deposited on top of the waveguide, thickness variations in dielectric confinement layers, or a solid segment in the bottom layer of a dual-hollow-core waveguide.

The integrated optical particle trap device can further comprise a perpendicular waveguide portion for use in injecting light into said channel in a direction which is substantially perpendicular to the Z-axis longitudinal axis and a third light source capable of introducing light into said channel perpendicular to the Z-axis and applying a lateral scattering force to the sample particle. The third light source is capable of forcing the sample particle into a particle well to prevent further movement of the sample particle in the direction of the Z-axis.

The integrated optical particle trap device can further comprise a means for injecting into said channel a sample material having an index of refraction which is lower than the index of refraction of the surrounding solid-state material. The integrated optical particle trap device can further comprise a means for injecting into said channel a sample material having an index of refraction which is lower than the index of refraction of the surrounding solid-state material; means for injecting light into said channel, wherein the injected light is guided within the channel and through the sample material; and a perpendicular waveguide portion for use in injecting light into said channel in a direction which is substantially perpendicular to a longitudinal axis of said tapered channel; and wherein said light intensity gradients are designed to exert a holding force on small particles of micron or sub-micron size.

BRIEF DESCRIPTION OF THE DRAWINGS

The file of this patent contains at least one drawing/photograph executed in color. Copies of this patent with color drawings/photographs will be provided by the Office upon request and payment of the necessary fee.

FIG. 4A shows an integrated dual beam trap. The left diagram shows a waveguide with counter-propagating beams experiencing power loss. The center diagram shows spatial dependence of left and right propagating power. The right diagram shows the resulting scattering forces and total force $F_{TOT}$.

FIG. 4B shows an integrated dual beam trap. The top diagrams shows an experiment setup. The bottom left picture shows microbeads in anti-resonant reflecting optical waveguide (ARROW) without trapping beams. The bottom right picture shows trapping at waveguide intersection in presence of trapping laser beams.

DETAILED DESCRIPTION

The present invention relates to an integrated optical particle trap device for use in controlling the placement of small sample particles configured as an optical waveguide comprising a non-solid core layer surrounded by a solid-state material, and two light sources capable of introducing light into said non-solid core at opposite ends along a Z-axis of said non-solid core to form two propagating light beams applying force in opposing directions. The present invention introduces concepts for trapping and manipulating particles in microfluidic channels using planar optical waveguides with dual beam traps using integrated optics to help trap a particle. Being able to accomplish these tasks without the need for additional microscopy equipment will result in planar, smaller, and easier-to-use traps that will play a huge role in emerging optofluidic systems that interrogate biomolecules and cells with single particle control.

Figure 1A:
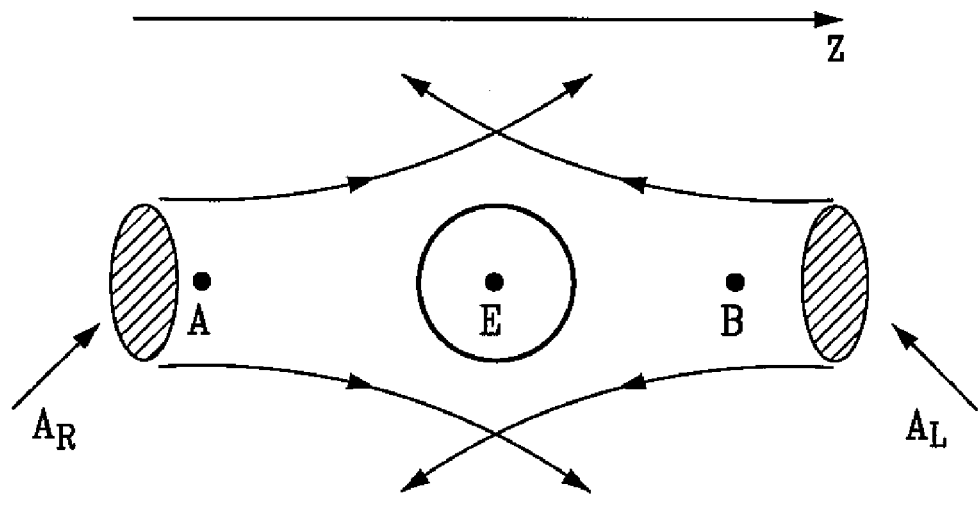
FIG. 1A shows conventional prior art dual-beam trap using free-space Gaussian beams.
Figure 1B:
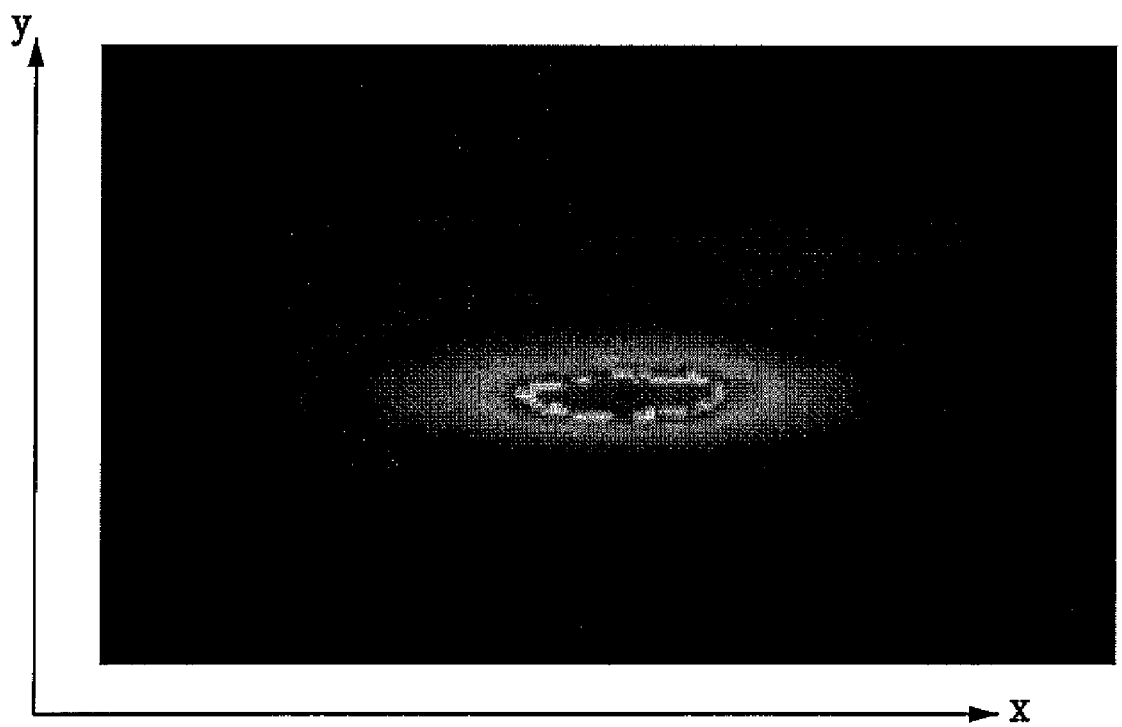
FIG. 1B shows typical mode intensity profile observed in single-mode liquid-core optical waveguides.
Figure 2:
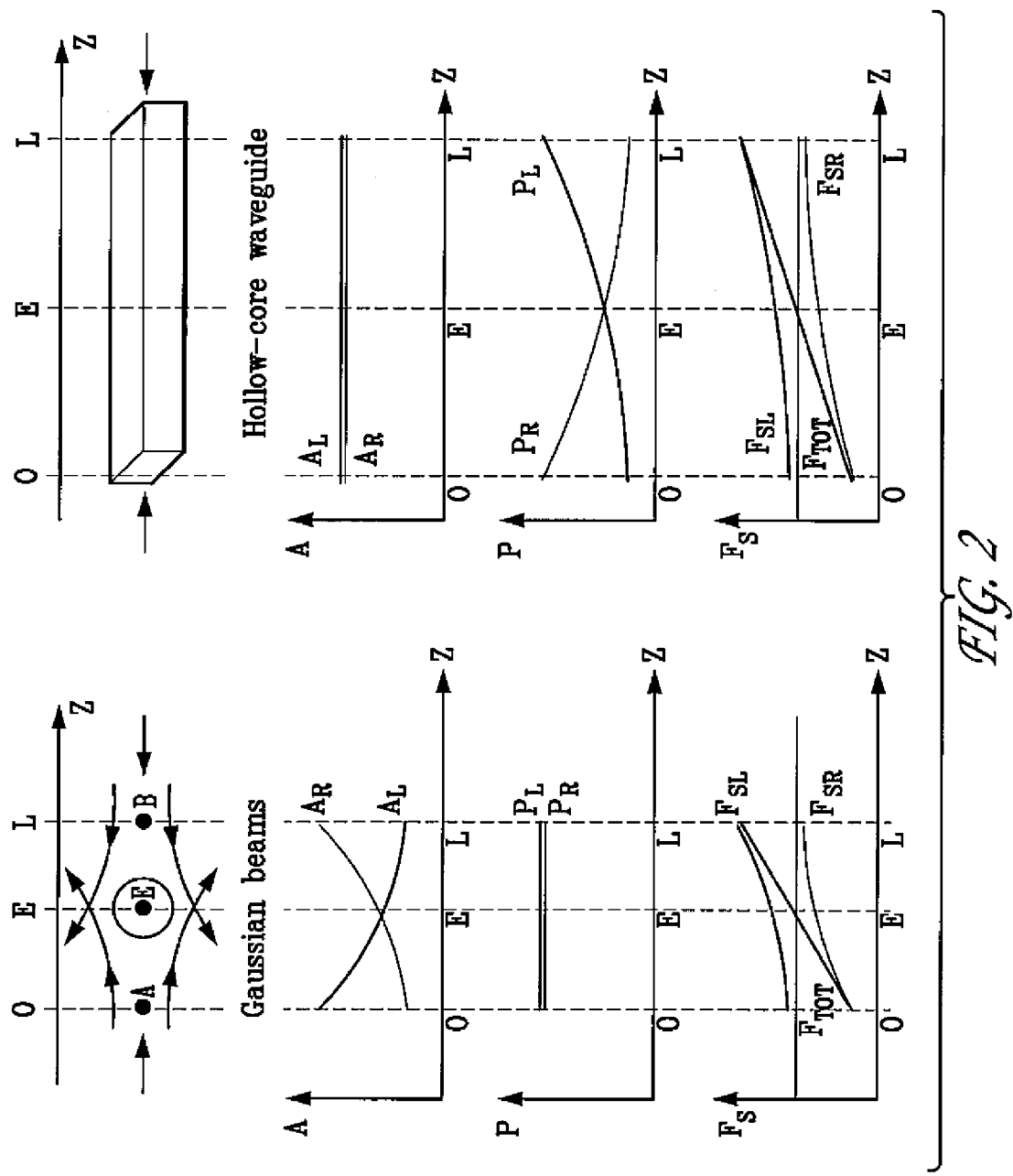
FIG. 2 shows a comparison between conventional prior art (left) and integrated (right)dual beam traps illustrating similarities and differences. Shown are the beam areas A, powers P, and scattering forces FS of left and right propagating beams.

Integrated Particle Traps Based Upon Waveguide-Loss (Power Gradient)-Based Dual Beam Trap The equation for the scattering force, $F_s \sim P/A$, shows how to implement a dual beam trap in an optical waveguide if the mode area A can not be adjusted for each beam individually. The key parameter is the mode power P. The power for left and right traveling beams is z-dependent due to the finite propagation loss in a waveguide. Indeed, $P_L(z)$ and $P_R(z)$ are different at each point z along the waveguide because in general both beams have traveled through different lengths. This difference can be substantial in hollow and liquid-core waveguides. Only at one point along the waveguide will both powers and therefore both scattering forces be equal. This point is the stable point of the integrated loss-based dual beam trap. A comparison between the conventional and integrated dual-beam traps is shown in FIG. 2.

The integrated trap works on a new and different principle than the conventional trap to create an imbalance of scattering forces. Confinement in x and y-directions is achieved by the intensity gradient of the waveguide mode, similar to the case of the free-space dual beam trap. Other dual beam traps using integrated optics to help trap a particle are based on the original principle of diverging beams and the particle trapping point is not located inside a waveguide. Constable et al., *Opt. Lett.* 18: 1867, 1993; Cran-McGreehin et al., *Lab on a Chip* 6: 1122, 2006.

Particle Manipulation

Particles can not only be trapped by the dual beams in the optical waveguide, but can also be moved along the waveguide in a controlled manner by adjusting the power of the beams to effectively change the location of the equilibrium (zero total force) point. The integrated trap can be implemented in any hollow-core waveguide that exhibits a finite propagation loss. Examples include, but are not limited to, anti-resonant reflecting optical waveguides (ARROW), slot waveguides, hollow-core photonic crystal fiber, omniguides, dual-hollow-core waveguides, and Bragg waveguides.

Figure 3A:
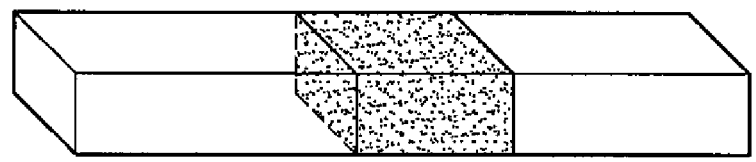
FIG. 3A shows waveguide with high loss section (dark) to create large power gradient.
Figure 3B:
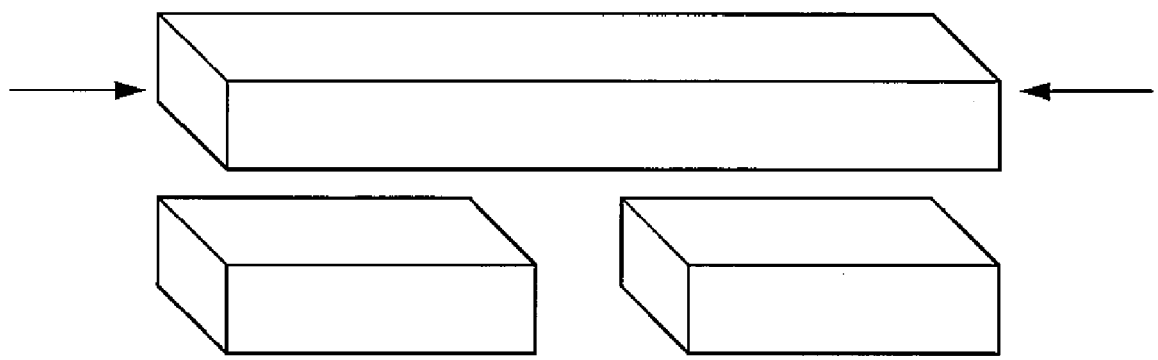
FIG. 3B shows dual-hollow-core waveguide with high loss section separating two bottom hollow channels. Only the top channel is used for waveguiding.

A key characteristic of the integrated trap in an optical waveguide is the amount of waveguide loss which determines the power gradient dP/dz. For tightly localized confinement, this gradient should be large, requiring a large waveguide loss. High waveguide loss may not be desirable for other (signal) beams propagating in the waveguides. Therefore, localized high-loss regions can be created which will have the additional advantage of providing predetermined trapping regions. This is illustrated in FIG. 3a where the dark region in the waveguide center indicates a segment with high loss that allows for highly localized trapping. Methods to implement a high loss region include, but are not limited to, tapering the width of the waveguide, depositing a lossy material on top of the waveguide, thickness variations in dielectric confinement layers, or a solid segment in the bottom layer of a dual-hollow-core waveguide as shown in FIG. 3b.

Particle Concentrator

Dual beam traps rely on an asymmetry of the intensities of two counterpropagating beams along the beam axis that leads to position-dependent scattering forces. All prior art implementations of this trap achieve this via an asymmetry in the beam areas. As described above, this approach cannot work in a waveguide because the beam area for both beams is the same at each point as determined by the waveguide mode. The present invention provides a new type of dual beam trap in which a space-dependent intensity is achieved via an asymmetry in beam power. This asymmetry is inherently built into a waveguide via the propagation loss. This is illustrated in FIG. 4a which shows counterpropagating beams in a waveguide that suffer propagation loss, the exponentially decaying power for left and right propagating beams and the resulting scattering forces. The trapping point is located where both powers are equal ($F_{TOT}=0$) and can be easily changed by adjusting the relative beam power. The depth of the trapping potential can easily be several times the thermal energy kT as required for stable trapping. FIG. 4b shows the experimental realization in an ARROW chip. A laser beam at 532 nm is split into two parts with P~10 mW that are coupled into the ARROW as shown. The right panels show a number of polystyrene beads (d=1 μm) in the absence and presence of the laser beams. The right image shows how the beads are accumulated and trapped at the trapping point which is chosen at the solid-hollow core intersection. This dual beam trap is the first trap in which the trapping point is located inside a waveguiding structure which enables controlled delivery of additional beams from different directions.

FIG. 4 already indicated that more than one particle can be trapped in the dual-beam ARROW trap. In fact, all particles in the guiding channel will be drawn towards the trapping location. This observation can be used to locally increase the particle concentration to create a larger fluorescence signal from the same excitation volume and starting concentration, resulting in easier detection.

Optical Particle Selection

Figure 5:
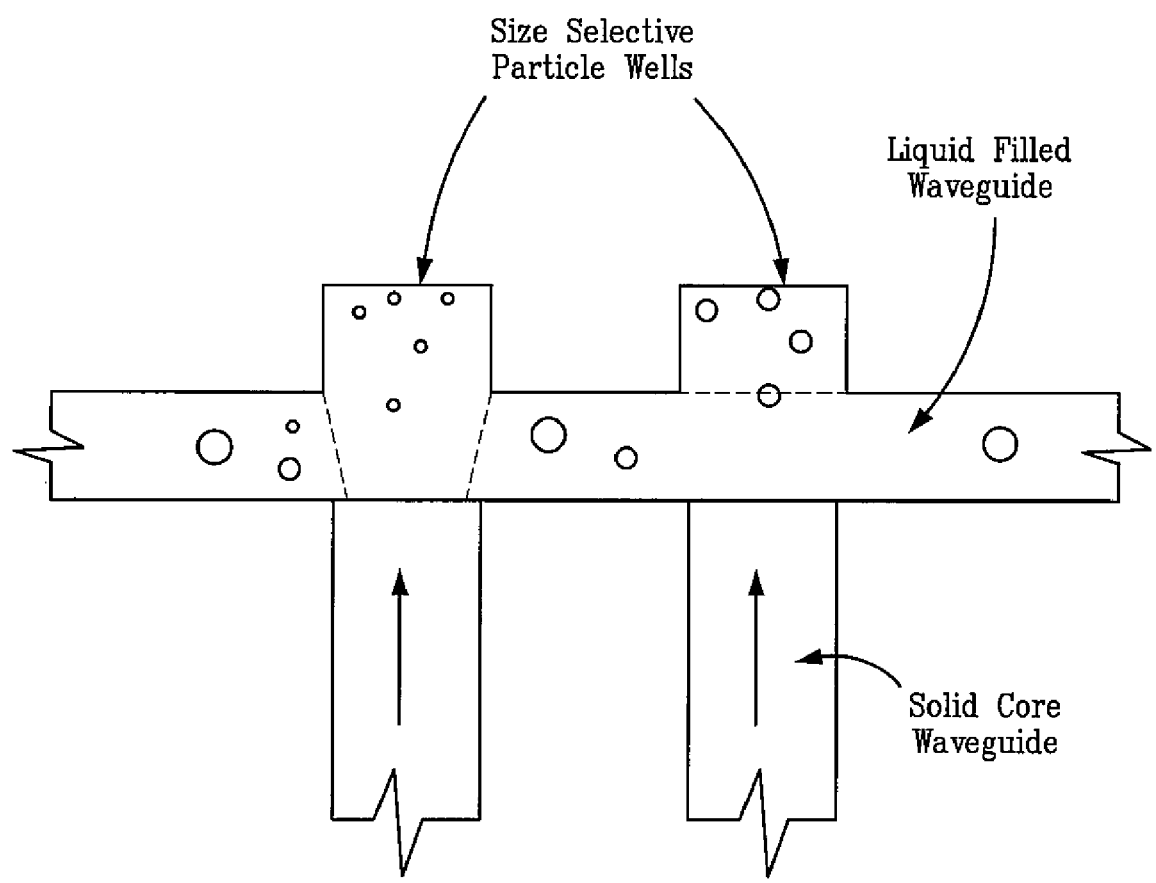
FIG. 5 shows size-dependent particle selection using intersecting control beams.

The acceleration a that a particle experiences as a result of the scattering force $F_S$ is given by $a=F_S/m$, where m is the particle mass. a is strongly size dependent ($a\sim r^{-3}$ for Mie particles (cells, microbeads) and $a\sim r^3$ for Rayleigh particles (nanoparticles, biomolecules)). One can take advantage of this property to implement size-dependent selection on a chip. This is illustrated in FIG. 5 for the example of microbeads of different size. A mixture of particle sizes is pushed horizontally along the liquid channel using a control beam or electrokinetic movement. An optical beam will already initiate separation depending on the particle size. In addition, the mixture is exposed to a strong control beam at various points where particles experience a lateral scattering force and are pushed towards particle wells. Only the particles with the highest lateral acceleration will be pushed into particle wells and prevented from moving further along the channel. By applying control beams of varying strength along the channel, different size ranges can be selected as shown in FIG. 5. The particles can be held in the wells by leaving the beams on and be released at a desired later time. We will demonstrate and explore this all-optical particle size selectivity both along and transverse to the channel. To this end, a mixture of microbeads of different sizes will be moved along the channel. Parameters such as laser powers, well placement and dimensions will be varied in order to characterize and maximize the size selectivity.

Loss Determination of Hollow-Core Waveguides by Optically-Induced Particle Transport A new method for loss measurements in hollow-core waveguides utilizing radiation pressure induced transport of dielectric microspheres is provided and experimentally demonstrated. Hollow-core waveguides have recently attracted increasing interest towards applications such as optical sensing. Loss measurements on hollow-core waveguides normally employ either destructive cleaving (cutback) or strongly depend on facet quality and include special facet treatment (cutback, OTDR). The present example introduces a fast, nondestructive, and facet independent method for determining the intrinsic mode loss of hollow-core waveguides.

Figure 6A:
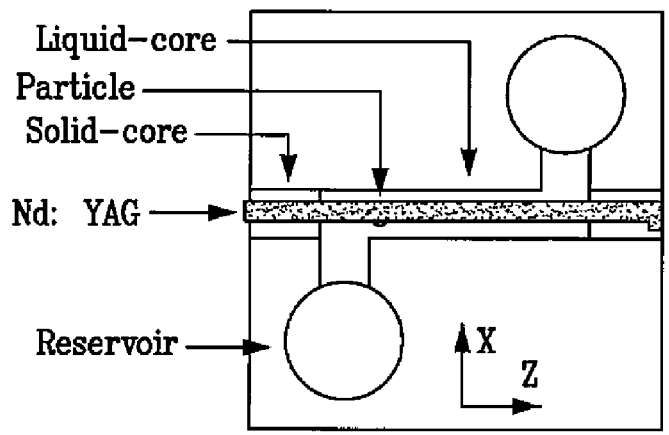
FIG. 6A shows waveguide loss measurement setup using an integrated ARROW platform consisting of different functional elements.
Figure 6B:
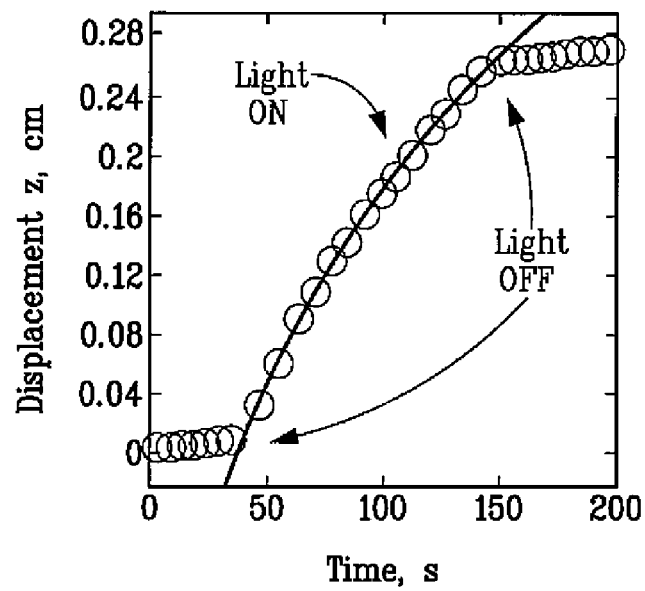
FIG. 6B shows particle displacement versus time (points) and log fit (line).
Figure 6C:
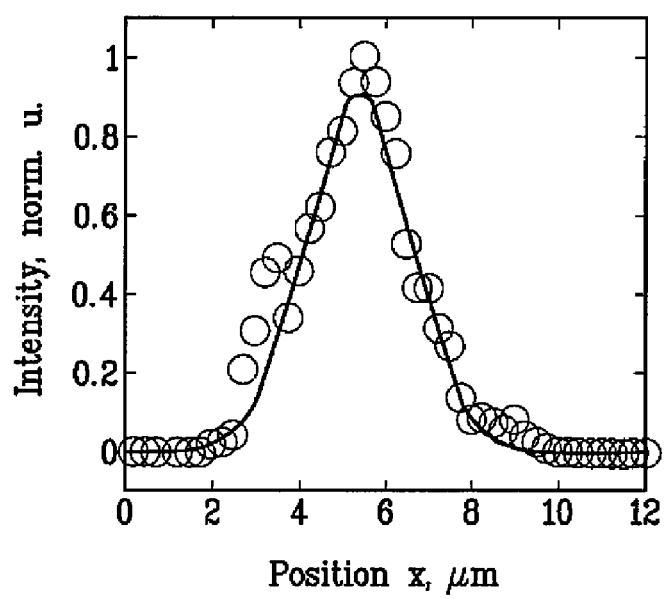
FIG. 6C shows output particle distribution across hollow-core waveguide (points) and Gaussian fit (line).

Radiation pressure has been used to manipulate particles. See, for example, A. Ashkin, "Acceleration and Trapping of Particles by Radiation Pressure," *Phys. Rev. Lett.* 24: 156 (1970). However the movement of a particle due to radiation pressure has not been used to determine the loss of a hollow-core waveguide. The radiation pressure force $F_{rad}(z)$ is proportional to the incident light power P and, in liquids, must be balanced by the Stokes' drag force, $$F_{Stokes}(z)=6\pi\eta r v(z)=F_{rad}(z)\propto P(z)\propto \exp(-\alpha_{wg}z) \qquad (1)$$

where v(z) is the particle velocity in a low Reynolds number flow, viscosity of the media is η, the particle radius is r, and αwg is the waveguide loss. Thus the velocity of the particle is related to the intrinsic waveguide loss. This is applicable to optically-induced particle motion in any hollow-core waveguide. To demonstrate this method and obtain v(z), we have utilized liquid filled hollow-core antiresonant reflecting optical waveguides (ARROWs) (FIG. 6a). D. Yin et al., "Integrated optical waveguides with liquid cores" *Appl. Phys. Lett.* 85: 3477 (2004). One micron diameter polystyrene spheres are suspended in water and added to the reservoirs. Light is coupled into the waveguide and optically-induced particle motion is observed (FIG. 6b). Velocities obtained by this method were up to ~100 µm/s with optical powers ~10 mW corresponding to forces on the order of pN. The loss calculated for FIG. 6b of 3.4 cm$^{-1}$ agreed, to within roughness scattering losses, with a simulation loss of ~3 cm$^{-1}$. Confirmation of the loss was also obtained using the conventional destructive cutback method. In addition, the mode dependent optical gradient force (in the x-direction) provides a unique method for mode reconstruction along the waveguide (FIG. 6c). Long sampling times for any point along the waveguide can be obtained, for example, by balancing the radiation pressure with electrokinetics. Furthermore, the solution can be changed to measure the loss dependence on core index. Therefore the present example has demonstrated a fast, flexible, noncomplex, and nondestructive method to determine the loss of a hollow-core waveguide which can be used to complement or replace other measurement methods.

Applications

The integrated optical particle trap device can be used for the manipulation of particles, including micron and sub-micron sized particles. The integrated optical particle trap device can be used for the study of biological agents such as manipulation of mesoscopic matter such as nanoclusters, colloidal particles, and biological cells, DNA molecules, or sub-cellular organelles for applications such as flow cytometry or spectroscopy in an optoelectronic and photonic integrated circuits. The integrated optical particle trap device can be used for detection and analysis of viruses or cells, for example, detection and analysis of bacteria such as *Escherichia coli*; Detection and separation of blood cells and components; The integrated optical particle trap device can be used for manipulation of nanomachines, microeletromechanical systems (MEMS) such as pumps and valves in microfluidic devices and lab-on-a-chip devices.

The selective generation and control of the integrated optical particle trap device can be useful in a variety of commercial applications, such as, optical circuit design and manufacturing, nanocomposite material construction, fabrication of electronic components, optoelectronics, chemical and biological sensor arrays, assembly of holographic data storage matrices, rotational motor, mesoscale or nanoscale pumping, energy source or optical motor to drive MEMS, facilitation of combinatorial chemistry, promotion of colloidal self-assembly, manipulation of biological materials, interrogating biological material, concentrating selected biological material, investigating the nature of biological material, and examining biological material.

The optical particle trap can concentrate small quantities of material for improved measurement by fluorescence or other detection methods. Optical setups for biomedical applications typically involve bulky three-dimensional setups and often times the use of microscope objectives for excitation and/or collection. The main reason behind this fact is the inability to guide light through the media in which the cells and molecules are hosted (typically aqueous solutions or gas phase), as these media have lower refractive indices than the surrounding solid-state material.

Here, we present the invention of a radically different approach to creating an experimental platform for optical studies on non-solid-state materials. By using an integrated optical particle trap device in specially designed multi-layer optical waveguides, it is possible to guide light through low-index media over macroscopic distances which will enable optical devices with both improved and novel capabilities. To our knowledge, such waveguides have never been fabricated to work with non-solid core layers as described herein.

The present approach to an integrated optical particle trap provides advantages compared to state-of-the-art techniques include:

low-loss guiding of light inside a narrow channel of low-index media (gaseous or liquid) on a semiconductor chip. Low-index in this context means that the refractive index of the sample material is less than any of the indices of the solid-state host material.

Ability to guide light in the same volume as the low-index material. This allows for transmission, absorption or interference measurements over macroscopic distances.

Ability to discriminate/filter selective wavelengths along the sample volume. This results from the fact that the waveguide is optimized for a desired wavelength range.

Entirely planar technology for high sensitivity optical measurements compatible with fiber-optic technology.

Massive parallelism for multiple measurements on a single chip.

Potential for further integration with additional optical elements such as photo detectors on the same chip.

Ability for optical measurements on microchannels of an order of magnitude smaller dimension.

Specific methods to fabricate hollow-core ARROW waveguides based on sacrificial core layers.

Platform for realizing large nonlinear phase shifts between light signals using EIT in atoms, e.g., Rb.

Integrated optical particle trap utilizing ARROW waveguides will achieve the following improvements over current state-of-the art methods: We can rely on light coupling and collection in the plane of the substrate leading to a compact scalable layout, higher coupling efficiencies of light emitted from a radiating dipole into the waveguide mode and consequently improved sensitivities. We can utilize fiber-optic waveguide coupling into the structures, which is well-developed in optoelectronics and photonics. We will be able to guide light along with the sample inside the chip, which will allow for completely novel experiments such as absorption measurements along the channel as well as simultaneous fluorescence detection and filtering along the direction of the sample flow. Importantly, we will gain the potential for parallel measurements on multiple channels since the excitation beam propagates in a waveguide mode—not as a Gaussian beam with a single focus as is the case in the approaches described above. Finally, ARROW waveguides will permit measurements on smaller volumes for flow cytometry.

The dramatic effect on flow cytometry is illustrated which compare optical guiding in a conventional microfluidic channel or capillary with two types of ARROW structures to be described in more detail below. The propagation loss in a double-ARROW structure are several orders of magnitude lower than in a regular microchannel. This leads to significantly improved waveguide transmission down to the micron range, which will be sufficient for detecting any bacteria and other cells with dimensions of a few microns.

One goal of ours is to have highly functional, highly parallel structures naturally combined with other integrated elements such as interferometers and detectors on the same chip. The research described herein provides the first crucial steps in this direction: the demonstration of waveguiding in ARROW structures with liquid core layers and the fabrication of simple elements suitable for fluorescence measurements on DNA molecules. We point out that the ARROW principle is well understood and being used in other areas. This will also be the first planar setup relying entirely on techniques successfully used in integrated optics.

As a result of our research, better measurement tools will evolve that will improve both our fundamental understanding of health-related processes in cells and molecules as well as lead to improved flow cytometry methods.

Below we provide a more detailed description of exemplary embodiments and applications of the present invention. The bulk focuses on fluid applications, however, these parts are also applicable to gases. In addition, it should be noted that invention may be carried out with a variety of substrate and waveguide materials, including the materials discussed in connection with the examples described below as well as those listed below (this list is not intended to be exhaustive):

Exemplary Substrates:
Semiconductors (useful for integrating electronic and optoelectronic devices (III-V semiconductors) with the waveguide), including silicon, Ge, diamond, all III-V semiconductors(GaAs, InP, HgCdTe, GaN, GaP, etc.).
Metals (useful for making a low cost device), including Al, Tin, Titanium, Copper, etc.
Plastics and Polymers (again useful for a low cost device and integrating with electronics on PCB boards). Insulators like ceramic or glass (useful because they produce a transparent substrate or because of heat mitigation).
Silicon based glasses—silica, quartz, soda lime, boron doped, etc.
alumina, sapphire
Exemplary Waveguide Materials:
Any material possibly deposited by chemical vapor deposition, including silicon dioxide, silicon nitride, silicon oxy-nitride (important because they are very commonly deposited by chemical vapor deposition).
Any material that could be sputtered or evaporated onto a substrate, including silicon dioxide, silicon nitride, and silicon-oxynitride.
Any material that could be spun-on or dip coated including spin-on-glass, polyimides, and polymer based materials.
Exemplary Sacrificial Layer Materials:
Any metal, including aluminum, silver, gold, titanium, tungsten, copper.
Polymer materials, including SU8, photoresist, and polyimide.

CONCLUSION

While the present invention has been described in connection with several presently preferred or illustrative embodiments, it is to be understood that other similar embodiments may be used or modifications and additions may be made to the described embodiments for performing the same functions of the present invention without deviating therefrom. For example, while exemplary embodiments of the invention are described as including ARROW waveguides, one skilled in the art will recognize that the present invention is not limited thereto, and that the methods described herein may apply to other implementations, and may be applied to any number of such devices and applications without departing from the invention. Therefore, the present invention should not be limited to any single embodiment, but rather should be construed in breadth and scope in accordance with the appended claims

What is claimed:

1. An optical waveguide for moving a sample material toward a zero total force point within the optical waveguide, the optical waveguide comprising:
   a substrate made of a solid material and multiple layers of solid-state material disposed on the substrate, and
   a non-solid core extending through at least one of said multiple layers, wherein said non-solid core may be used to contain a sample material,
   wherein said optical waveguide is configured to receive two light sources into said non-solid core at opposite ends along a Z-axis of said non-solid core to form two propagating light beams applying force in opposing directions, each light source having a finite propagation power loss that is Z-dependent in the waveguide such that the sample material is moved toward a zero total force point within the waveguide.

2. The optical waveguide of claim 1 wherein the optical waveguide is an ARROW waveguide, slot waveguide, hollow-core photonic crystal fiber, omniguide, dual-hollow-core waveguide, or Bragg waveguide.

3. The optical waveguide of claim 1, further comprising a high waveguide loss region within the non-solid core to create a large power gradient capable of highly localized sample material confinement.

4. The optical waveguide of claim 3 wherein the high waveguide loss region comprises a tapered width of the waveguide, a lossy material deposited on top of the waveguide, thickness variations in dielectric confinement layers, or a solid segment in the bottom layer of a dual-hollow-core waveguide.

5. The optical waveguide of claim 1 wherein said sample material is micron or sub-micron size particles.

6. The optical waveguide of claim 1 wherein said substrate comprises silicon and said multiple layers comprise SiO2 and SiN.

7. The optical waveguide of claim 2 wherein said non-solid core has an index of refraction which is lower than the index of refraction of the surrounding solid-state material, and wherein light can be transmitted with low loss through the non-solid core.

8. The optical waveguide of claim 1 wherein said optical waveguide is generally structured as an anti-resonant reflecting optical waveguide (ARROW).

9. The optical waveguide of claim 1, further comprising an antiresonant reflecting layer adjacent to said non-solid core, whereby light is substantially prevented from leaking out of said core in a transverse direction.

10. The optical waveguide of claim 1 wherein said substrate comprises a semiconductor material.

11. The optical waveguide of claim 1 wherein said substrate comprises a metal.

12. The optical waveguide of claim 1 wherein said substrate comprises a plastic.

13. The optical waveguide of claim 1 wherein said substrate comprises a polymer.

14. The optical waveguide of claim 1 wherein said substrate comprises a Silicon based glass.

15. The optical waveguide of claim 1 wherein said substrate comprises alumina.

16. The optical waveguide of claim 1 wherein said substrate comprises sapphire.

17. The optical waveguide of claim 1 wherein the layer of solid-state material through which said non-solid core extends comprises a material deposited by chemical vapor deposition.

18. The optical waveguide of claim 1 wherein the layer of solid-state material through which said non-solid core extends comprises silicon oxy-nitride.

19. The optical waveguide of claim 1 wherein the layer of solid-state material through which said non-solid core extends comprises a material sputtered onto said substrate.

20. The optical waveguide of claim 1 wherein the layer of solid-state material through which said non-solid core extends comprises a material evaporated onto said substrate.

21. The optical waveguide of claim 1 wherein the layer of solid-state material through which said non-solid core extends comprises silicon dioxide.

22. The optical waveguide of claim 1 wherein the layer of solid-state material through which said non-solid core extends comprises silicon nitride.

23. The optical waveguide of claim 1 wherein the layer of solid-state material through which said non-solid core extends comprises silicon oxy-nitride.

24. The optical waveguide of claim 1 wherein the layer of solid-state material through which said non-solid core extends comprises a material spun-on said substrate.

25. The optical waveguide of claim 1 wherein the layer of solid-state material through which said non-solid core extends comprises a material dip coated onto said substrate.

26. The optical waveguide of claim 1 wherein the waveguide is made using a sacrificial layer material comprising a metal.

27. The optical waveguide of claim 1 wherein the waveguide is made using a sacrificial layer material comprising a polymer.

28. An integrated optical particle trap device for controlling placement of sample particles within an optical waveguide, the integrated optical particle trap comprising:
an optical waveguide comprising a channel surrounded by a solid-state material, including a Fabry-Perot reflector adjacent to said channel, whereby light, once injected, is substantially prevented from leaking out of said channel in a transverse direction, and
two light sources capable of introducing light into said channel at opposite ends along a Z-axis of said channel to form two propagating light beams applying force in opposing directions, wherein the two light sources have a finite propagation power loss that is Z-dependent in the waveguide and are capable of moving the sample particles along the Z-axis toward a zero total force point within the waveguide.

29. The device of claim 28 wherein the power of the two opposing light sources is capable of adjustment to move the sample material within the waveguide.

30. The device of claim 28 wherein the optical waveguide is an ARROW waveguide, slot waveguide, hollow-core photonic crystal fiber, omniguide, dual-hollow-core waveguide, or Bragg waveguide.

31. The device of claim 28, further comprising a high waveguide loss region within the channel to create a large power gradient capable of highly localized sample material confinement.

32. The device of claim 31 wherein the high waveguide loss region comprises a tapered width of the waveguide, a lossy material deposited on top of the waveguide, thickness variations in dielectric confinement layers, or a solid segment in the bottom layer of a dual-hollow-core waveguide.

33. The device of claim 28 further comprising a perpendicular waveguide portion for use in injecting light into said channel in a direction which is substantially perpendicular to the Z-axis and a third light source capable of introducing light into said channel perpendicular to the Z-axis and applying a lateral scattering force to the sample particle.

34. The device of claim 33 wherein the third light source is capable of forcing the sample particle into a particle well to prevent further movement of the sample particle in the direction of the Z-axis.

35. The device of claim 28, further comprising means for injecting into said channel a sample material having an index of refraction which is lower than the index of refraction of the surrounding solid-state material.

36. The device of claim 28, wherein said sample particles are micron or sub-micron size.

37. A device as recited in claim 28, further comprising:
means for injecting into said channel a sample material having an index of refraction which is lower than the index of refraction of the surrounding solid-state material;
means for injecting light into said channel, wherein the injected light is guided within the channel and through the sample material; and
a perpendicular waveguide portion for use in injecting light into said channel in a direction which is substantially perpendicular to a longitudinal axis of said channel;
wherein said injected light is designed to exert a holding force on small particles of micron or sub-micron size.

38. A method for controlling placement of a sample material within an optical waveguide, wherein the optical waveguide comprises a substrate made of a solid material and a channel extending through said optical waveguide, whereby light injected into an end of the channel is substantially prevented from leaking out of said channel in a transverse direction, the method comprising:
introducing light from a first light source at one end of a channel of the optical waveguide along a Z-axis of said channel;
introducing light from a second light source at an opposite end of said channel of the optical waveguide along the Z-axis of said channel, whereby said first light source and said second light source apply force within the channel in opposite directions;
controlling placement of the sample material within the optical waveguide by adjusting the power of at least one of said first light source and said second light source;
wherein said first light source and said second light source have a finite propagation power loss that is Z-dependent in the waveguide.

39. The method of claim 38, further comprising:
introducing light from a third light source into said channel in a direction which is substantially perpendicular to the Z-axis of the channel, wherein said third light source applies a lateral scattering force to the sample material.

40. The method of claim 38, wherein said sample material comprises a single particle.

41. The method of claim 38, wherein said sample material comprises multiple particles, whereby said controlling placement of the sample material within the optical waveguide results in a local concentration of said multiple particles.

* * * * *